United States Patent [19]

Spiegel et al.

[11] Patent Number: 4,530,542
[45] Date of Patent: Jul. 23, 1985

[54] NON-FERROUS WHEEL CENTER WITH CHROMED STEEL COVER

[75] Inventors: Martin A. Spiegel, Compton, Calif.; Greg Weld, Lee's Summit, Mo.

[73] Assignee: Mr. Gasket Company, Cleveland, Ohio

[21] Appl. No.: 509,818

[22] Filed: Jun. 29, 1983

[51] Int. Cl.³ .......................... B60B 3/00; B60B 7/00
[52] U.S. Cl. .................. 301/37 R; 301/63 R; 301/65
[58] Field of Search .......... 301/37 R, 63 R, 63 PW, 301/63 D, 63 DD, 64 R, 64 SD, 64 SH, 65

[56] References Cited

U.S. PATENT DOCUMENTS

| | | |
|---|---|---|
| 1,378,877 | 5/1921 | Lachman . |
| 1,432,493 | 10/1922 | Record et al. ............ 301/64 SH X |
| 1,477,915 | 12/1923 | Seymour . |
| 1,573,238 | 2/1926 | Forsyth . |
| 1,854,728 | 4/1932 | Baker . |
| 2,181,364 | 11/1939 | Burger ............................. 301/65 X |
| 3,214,220 | 10/1965 | Foster et al. . |
| 3,554,535 | 1/1971 | Gerry . |
| 3,582,141 | 6/1971 | Kelsey, Jr. ...................... 301/65 X |
| 3,669,501 | 6/1972 | Derleth . |
| 3,726,566 | 4/1973 | Beith . |
| 3,756,658 | 9/1973 | Adams . |
| 3,767,267 | 10/1973 | Clement . |
| 3,859,704 | 1/1975 | Nasson . |
| 4,094,550 | 6/1978 | Toal et al. . |
| 4,316,637 | 2/1982 | Reynolds et al. . |
| 4,361,358 | 11/1982 | Bonniwell et al. ............... 301/65 X |

FOREIGN PATENT DOCUMENTS 53-69302  6/1978  Japan ............................. 301/63 DD

*Primary Examiner*—David A. Scherbel
*Attorney, Agent, or Firm*—Roylance, Abrams, Berdo & Goodman

[57] ABSTRACT

A wheel has a structural wheel center of non-ferrous metal, such as aluminum or magnesium, with the outboard surface of the wheel center being unplated and of unfinished appearance, a tire supporting rim connected to the wheel center, and a chrome plated, thin gauge, steel cover applied over the outboard side of and attached to the wheel center. The cover conforms to and covers the unfinished outboard surface of the wheel center and gives the wheel the appearance of having a chromed, non-ferrous wheel center. Preferably, outer and inner axial flanges on the cover are a press fit onto corresponding shoulders of the wheel center.

13 Claims, 5 Drawing Figures

NON-FERROUS WHEEL CENTER WITH CHROMED STEEL COVER

FIELD OF THE INVENTION

This invention relates to wheel centers and wheels constructed therewith, particularly automobile and other vehicle wheels. The invention is concerned with wheels in which at least the wheel center is made of non-ferrous metal.

BACKGROUND OF THE INVENTION

It is known to make vehicle wheels from non-ferrous alloys, advantageously to reduce the unsprung weight of the vehicle, but also for prestigious reasons with more sporty automobiles particularly sports cars.

These wheels can be made completely of such light weight alloys, or may have a non-ferrous alloy wheel center surrounded by a conventional steel rim.

The alloys used are usually basically aluminum or magnesium. One disadvantage of such alloys is that they are difficult to aesthetically finish such as by polishing or plating. If left unfinished, they have a full, uninteresting appearance. A highly desired finish for a prestigious wheel is chrome plating. However, to chrome plate these non-ferrous alloys is very difficult and is accompanied with consequential high costs.

SUMMARY OF THE INVENTION

It is an object of the present invention to provide a non-ferrous wheel center which has the appearance of being chromed but avoids the difficulties associated with chroming non-ferrous alloys such as aluminum or magnesium.

A feature by which this object is achieved is by leaving the non-ferrous alloy effectively unfinished, and applying to the outboard surface of the wheel center a chromed, steel-stamped cover. This provides a wheel having the advantages of both a non-ferrous wheel center and a conventional steel wheel. A chromed, non-ferrous wheel center is obtained without actually chroming the non-ferrous alloy.

Another object of the present invention is to provide a chromed cover on a non-ferrous metal wheel center to provide a chromed unitary construction. A feature by which this is achieved is the provision of axial peripheral flanges on the cover which are a press fit on corresponding shoulders on the wheel center. This has the advantage that the cover can be pressed onto the wheel center and then form a skin over the outboard surface thereof. A further advantage is that by chroming these peripheral flanges, the wheel center has the appearance of being made of solid alloy which has been chromed.

Therefore, according to the present invention there is provided a composite wheel having the advantages of both a non-ferrous wheel and a conventional steel wheel, the composite wheel having an outboard side and an inboard side, and comprising a structural wheel center of non-ferrous metal with the outboard surface thereof being left unpolished, unplated, and generally of unfinished appearance. A chrome plated, thin, steel cover is applied over and attached to the wheel center with this cover conforming to and covering the entire outboard unfinished surface of the wheel center. A rim is connected to the wheel center for accommodating a tire. The chromed cover gives the wheel the appearance of having a chromed, non-ferrous wheel center.

Preferably, the decorative cover is a press fit on the wheel center. Shoulders on the wheel center for engagement by flanges on the cover can be disposed at or adjacent the radially inner and outer peripheries of the wheel center so that the cover extends from an axle hub hole in the center of the wheel center to or closely adjacent the tire supporting rim.

An air gap is preferably provided between the outer periphery of the covered wheel center and the wheel rim.

By form fitting the chromed cover to the outboard side of the wheel center, the cover may be attached to the wheel center by adhesive, or simply by the regular wheel mounting studs and nuts when the wheel is mounted on a vehicle, to give the appearance of the entire wheel center being made of chromed non-ferrous metal. Inturned flanges on the chromed cover considerably aid this appearance, and although preferably these inturned flanges are a press fit on shoulders of the wheel center, this press fit may be dispensed with and attachment rely solely on adhesive and/or the wheel mounting studs and nuts.

Other objects, features and advantages of the present invention will become more fully apparent from the following detailed description of the preferred embodiment, the appended claims and the accompanying drawing.

DETAILED DESCRIPTION OF THE PREFERRED EMBODIMENT

Figure 1:
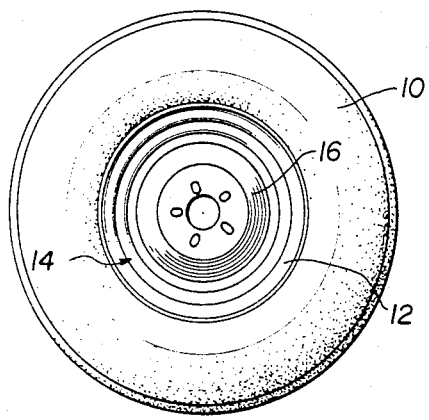
FIG. 1 is an elevational view from the outboard side of a wheel according to the invention with a tubeless tire mounted thereon.

FIG. 1 shows a vehicle wheel assembly having a tubeless tire 10 mounted on the rim 12 of a wheel 14 having a decorative cover 16 mounted over the outboard side of a structural wheel center which is hidden by the cover 16. The wheel center, which will be described more fully later, is made of non-ferrous metal to provide a lighter weight wheel.

Figure 2:
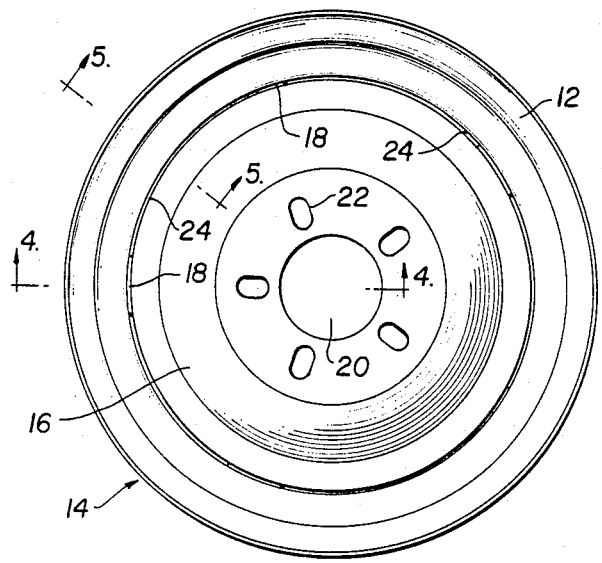
FIG. 2 is a corresponding elevational view on a larger scale of the wheel only of FIG. 1.

FIG. 2 shows the wheel 14 without the tire. The rim 12 is a conventional steel pressing and is connected to the covered wheel center by five steel brackets 18 equispaced around the inner periphery of the rim as will be described more fully later. The cover 16 has a central hole 20 for mounting over the axle hub of a vehicle, and five elongated holes 22 through which the mounting studs of the vehicle hub engage. The holes 22 are elongated in the radial direction and are disposed equispaced in a circle concentric with the central hole 20. Although not seen in FIG. 2, the wheel center has corresponding center and stud holes which align with those of the cover 16. The elongate holes 22 enable the wheel 14 to be mounted on vehicle hubs having various diameters for the circle upon which the mounting studs are disposed. To accomplish this, adaptors (not shown) are placed in the holes 22 to form bores corresponding to the size and location of the mounting studs. If desired, the holes 22 could be circular and arranged to fit only one size of vehicle hub. A small air gap 24 is disposed between the outer periphery of the cover 16 (and the wheel center upon which it is mounted) and the inner periphery of the rim 12. This air gap extends arcuately between the brackets 18.

Figure 3:
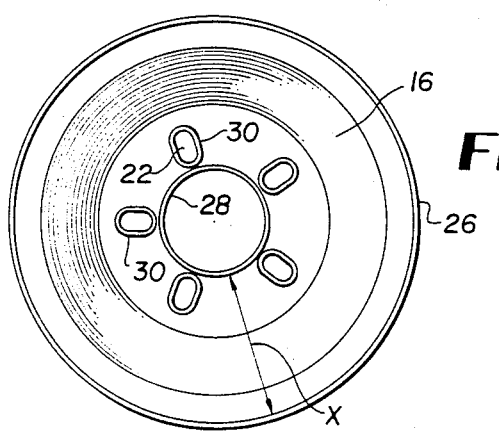
FIG. 3 is an elevational view from the inboard side of the center cover only of the wheel of FIG. 2.

FIG. 3 shows the inboard side of the cover 16, i.e. the side that faces towards the wheel center and towards the vehicle. A cylindrical flange 26 extends axially from the outer periphery of the cover 16 in the inboard direction, i.e. inwardly towards the vehicle when the wheel is mounted for use. Another cylindrical flange 28 extends axially from the inner periphery of the cover 16. The radial distance x between the radially outwardly facing surface of the inner flange 28 and the radially inwardly facing surface of the outer flange 26 is critical as will be explained later. Each of the holes 22 also has a short, tube-like peripheral flange 30 extending axially in the inboard direction.

The cover is made as a stamping from thin gauge sheet steel, for example 0.010 inch or less thick. The complete surface of the cover 16 on both the inboard and outboard sides is chromium plated over nickel plating to give an aesthetically pleasing chrome plated appearance and to protect the sheet steel against rusting. For appearance only, the cover 16 could be plated only on the outboard side together with the radially outwardly facing surface of the outer flange 26 and the radially inwardly facing surface of the inner flange 28.

Figure 4:
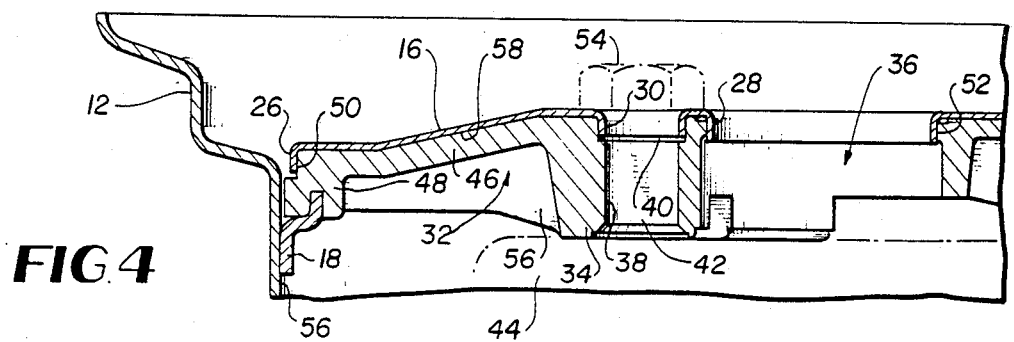
FIG. 4 is a fragmentary section on the line 4—4 of FIG. 2.

FIG. 4 shows in section the outboard half of part of the rim 12, and a substantial part of the wheel center 32. The wheel center 32 has a central annular boss 34 having a center hole 36 and five stud holes 38 (only one of which can be seen). Each stud hole 38 has a recess 40 at its outboard end to accommodate the axial flanges 30 of the holes 22. A stud 42 of a vehicle axle hub 44 is shown extending through the stud hole 38 as a relatively close fit therein due to the recess 40 enabling the flange 30 to have an internal diameter no less than that of the stud hole 38. The wheel center has a disc-like wall 46 of generally annular configuration extending radially outwardly from the boss 34 and terminating outwardly in an enlarged bead 48. The bead 48 has a radially outwardly facing shoulder 50 over which the flange 26 of the cover fits. The hub 34 has a radially inwardly facing cylindrical shoulder 52, at the outboard end of the center hole 36, and the inner flange 28 of the cover fits over the shoulder 52. As can be seen, the middle portion of the disc-like wall 46 diverges outwardly in the outboard direction from the bead 48 to the hub 34. Also, as can be seen, the thin cover 16 closely follows the contour of the outboard side of the wheel center and functions as an outer skin thereon. The dimension x referred to above (see FIG. 3) is chosen in relation to the radial distance between the shoulders 50 and 52 so that the cover 16 is a press fit on the wheel center 32 due to the engagement of the flanges 26, 28 onto the shoulders 50, 52. This press fit is toleranced so that during manufacture it is not difficult to press the cover 16 onto the wheel center 32, but creates a sufficiently tight grip by the flanges 26, 28 to retain the cover 16 on the wheel center 32 as a unitary assembly. Thus, when the composite wheel 14 is handled, e.g. during wheel changes, or during distribution handling, the cover 16 remains securely in place. During use on a vehicle, screw-threaded nuts 54 (one of which can be seen in phantom), securing the wheel assembly on the studs 42 against the axle hub 44, bear against the outboard surface of the cover 16 and further secure the cover in place. This safeguards against additional and unpredictable stresses to which the cover 16 may be subjected during some vehicle operating conditions.

A series of strengthening ribs 56 extend inwardly from the disc-like wall 46 and radially between the hub 34 and bead 48. The wheel center 32 is cast from aluminum, although other light weight non-ferrous metals such as magnesium and alloys containing aluminum or magnesium may be used provided they have the necessary strength qualities.

Five Z shaped steel brackets (only one of which can be seen in FIG. 4) secure the steel rim 12 to the wheel center 32. Each bracket has one end leg embedded in an enlarged lug formed in the bead 48, and the other end leg welded to the radially inwardly facing wall of the rim 12. This approach to attaching a non-ferrous metal wheel center to a conventional steel rim and the reason therefor is in general known, and is more fully disclosed in U.S. Pat. Nos. 3,410,606; 3,302,273; 3,250,572; and 3,250,571, and the disclosures in all of these patents are hereby incorporated herein by reference.

Figure 5:
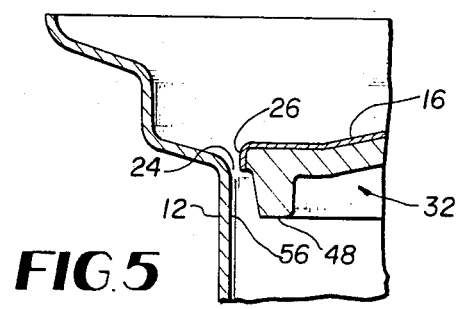
FIG. 5 is a fragmentary section on the line 5—5 of FIG. 2.

FIG. 5 shows a fragmentary section corresponding to the lefthand side of FIG. 4 but taken at a location between the brackets 18. This shows the true cross-section of the bead 48 and the radially outer flange 26 of the cover being located slightly radially inwards of the radially inwardly facing wall 56 of the steel rim 12. In this way, the small air gap 24 is created between the wheel center 32 and the rim 12; this air gap extending around the junction between the wheel center and the rim except where interrupted by the brackets 18. Apart from facilitating manufacture of the composite wheel, this air gap enables heat generated during vehicle braking gto be dissipated; the effect of heat on the tire supporting rim is thus minimized. If desired, additional holes may be provided around the peripheral portion of the wheel center 32 and cover 16 radially inwardly of the bead 48 to further aid dissipation of heat. An advantage of the location of the air gap 24 is that it prevents hot air being trapped against the wall 52 of the rim.

Another advantage of this wheel in having the cover only extend over the wheel center, and not over the tire supporting rim, is that the chromed cover avoids being damaged during tire changing operations and also when the wheel inadvertently scrapes against curbs and the like. This helps avoid disfiguration of the decorative chrome during normal use of the wheel on a motor vehicle.

The cover 16 may be secured to the wheel center 32 by adhesive. This may be applied over the whole area of contact between the wheel center 32 and cover 16, as represented by the junction line 58 in FIG. 4, or may be applied at selected locations. This adhesive, if used, is preferably employed in addition to the press fit of the cover on the wheel center, but in the broader aspects of the invention the adhesive could be employed in place of this press fit.

In another modification, the flanges 30 of the cover 16 may be a press fit in the stud holes 38 in the wheel center, this press fit preferably being in addition to the press fit between the flanges 26, 28, but could be in place thereof.

Also, the radially outwardly facing shoulder 50 of the wheel center could be formed by a wall of a slot or groove formed in the wheel center.

It will be appreciated that the present invention provides a composite wheel that has the desirable advantage of a non-ferrous wheel center, but avoids the difficulties and expense of polishing or chrome plating the outboard surface of the non-ferrous wheel center. The chromed cover is simple and relatively inexpensive to produce, and provides a chromed finish virtually as easily as that obtained with conventional steel wheels using removable chromed hub caps. However, the present invention provides a composite wheel of unitary construction which has the appearance of having a chromed non-ferrous wheel center and, due to the cover in effect forming a skin over the wheel center, feels and sounds like a solid, chromed, non-ferrous wheel center.

The center hole 36 will, of course, be covered in use by a hub cap. Such hub caps and various manners of their removable attachment to the wheel center are well known in the art.

As will be appreciated the composite wheel provided by the present invention has the combined advantages of light weight, decorative, and prestigious appearance. Moreover, the thin, chromed cover employed to achieve this appearance is to all intents and purposes non-removable in use.

The above described embodiments, of course, are not to be construed as limiting the breadth of the present invention. Modifications, and other alternative constructions, will be apparent which are within the spirit of the invention and scope of the appended claims.

What is claimed is:

1. A wheel, comprising:
   a non-ferrous metal, structural wheel center having an outboard side and an inboard side;
   a rim connected to said wheel center for receiving a tire;
   means for mounting said wheel center on an axle hub of a vehicle for rotation of the wheel about a central axis thereof;
   a radially outwardly facing shoulder formed around the outboard side of said wheel center adjacent said rim;
   a chrome plated, steel cover extending over, covering and conforming to the entire outboard side of said wheel center;
   said cover having an outer axially extending flange around the outer periphery thereof; and
   said flange engaging over said shoulder.

2. The wheel of claim 1, wherein said flange and said shoulder are cylindrical, and said flange is a press fit over said shoulder.

3. The wheel of claim 1, wherein said wheel center has a central aperture therein, said cover is annular with an inner axial flange extending from the inner periphery thereof, and said inner axial flange engages in said central aperture.

4. The wheel of claim 3, wherein said mounting means comprises a plurality of stud holes for receiving wheel mounting studs of a vehicle's axle hub, said cover has therein a plurality of holes aligned with said stud holes, and said cover holes have axial flanges engaged in said stud holes.

5. The wheel of claim 4, wherein the outboard end of said stud holes are recessed to receive said cover hole flanges.

6. The wheel of claim 5, wherein said cover hole flanges are a press fit into said recessed stud holes.

7. The wheel of claim 3, wherein said outer and inner flanges are a press fit onto said wheel center.

8. The wheel of claim 1, wherein said outer flange is spaced radially inward of said rim and there is an air gap between said outer flange and said rim, said air gap extending from the outboard side to the inboard side of said wheel center.

9. The wheel of claim 1, wherein said rim is steel and is connected to said wheel center by a plurality of steel brackets.

10. The wheel of claim 9, wherein said non-ferrous metal is selected from the group consisting of aluminum, magnesium, or alloys thereof.

11. The wheel of claim 1, wherein said cover is adhesively attached to said wheel center.

12. The wheel of claim 1, wherein said cover is a stamping from thin gauge sheet steel having a thickness no greater than 0.010 inch, and is contoured to closely fit the contour of the outboard side of said wheel center.

13. An automobile wheel, comprising:
    a structural wheel center made of a non-ferrous metal, and having an inboard side and an outboard side;
    a steel rim connected to said wheel center by a plurality of brackets welded to said rim and embedded in said wheel center;
    a chrome plated, steel-stamped cover extending over the outboard side of said wheel center and conformed to closely fit the surface contours of the outboard side of said wheel center;
    said wheel center and said cover both having a central aperture, and aligned stud holes for receiving conventional mounting studs of a vehicle's axle hub;
    said cover having an axial outer flange around the outer periphery thereof, an axial inner flange around the periphery of the central aperture thereof, and axial stud hole flanges around the stud holes thereof;
    said wheel center having a radially outwardly facing shoulder on the outboard side thereof around the outer periphery thereof and adjacent said rim; and
    said stud hole flanges engaging in the stud holes of said wheel center, said inner flange engaging in the central aperture of said wheel center, said outer flange engaging over said shoulder, and said inner and outer flanges being a press fit on said wheel center;
    whereby said wheel center and said cover form a unitary structure and the wheel has the appearance of having a chromed, non-ferrous wheel center.

* * * * *